(12) United States Patent
Fuchida et al.

(10) Patent No.: US 6,644,860 B2
(45) Date of Patent: Nov. 11, 2003

(54) RADIAL ROLLER BEARING, ROTATING APPARATUS USING SAME AND METHOD OF MANUFACTURING THE APPARATUS

(75) Inventors: Takeshi Fuchida, Kariya (JP); Hidemi Ikai, Kariya (JP)

(73) Assignee: Denso Corporation, Kariya (JP)

( * ) Notice: Subject to any disclaimer, the term of this patent is extended or adjusted under 35 U.S.C. 154(b) by 65 days.

(21) Appl. No.: 09/985,782

(22) Filed: Nov. 6, 2001

(65) Prior Publication Data

US 2002/0054723 A1 May 9, 2002

(30) Foreign Application Priority Data

Nov. 7, 2000 (JP) .................................... 2000-339061

(51) Int. Cl.7 ............................................. F16C 33/64
(52) U.S. Cl. ..................................................... 384/569
(58) Field of Search ................................. 384/569, 564, 384/912, 492, 513

(56) References Cited

U.S. PATENT DOCUMENTS 4,350,397 A * 9/1982 Cornish et al. ............. 384/569
5,385,413 A * 1/1995 Murphy et al. ............. 384/564
6,109,791 A * 8/2000 Metton et al. .............. 384/581

* cited by examiner

Primary Examiner—Lenard A. Footland
(74) Attorney, Agent, or Firm—Posz & Bethards, PLC

(57) ABSTRACT

In a radial roller bearing having an outer race and rollers, the outer race has a cylindrical portion and first and second flanges extending radially inward from opposite axial ends of the cylindrical portion. Hardness or strength of the cylindrical portion in a vicinity of the first flange is higher than that in a vicinity of the second flange. A shape of the first flange is different from that of the second flange. When the radial roller bearing is assembled to hold a rotating shaft on which a radial load acts, the outer race is easily oriented in an axial direction of the rotating shaft based on the shape difference between the first and second flanges so that the cylindrical portion in the vicinity of the first flange receives higher bearing pressure due to the radial load. Accordingly, flaking or peeling is unlikely to occur so that life time endurance and strength of the radial roller bearing is improved.

7 Claims, 6 Drawing Sheets

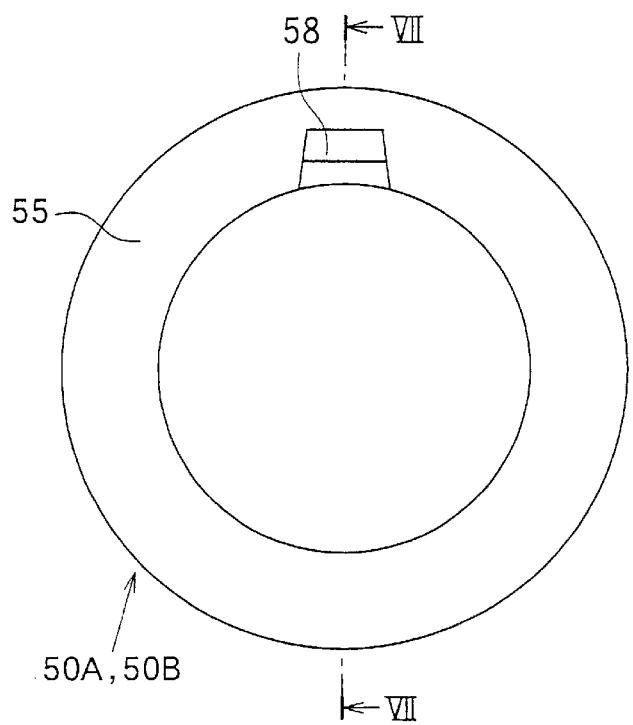
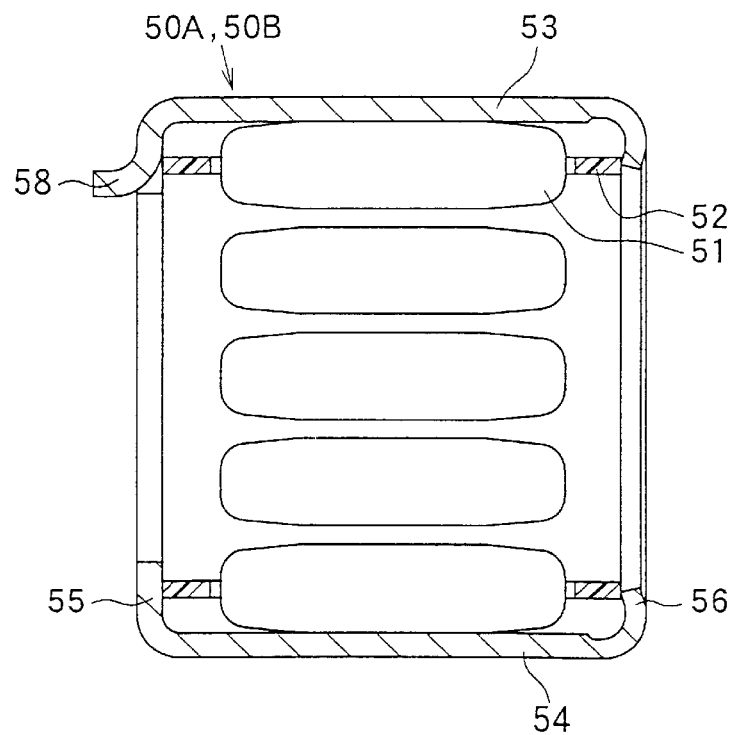

RADIAL ROLLER BEARING, ROTATING APPARATUS USING SAME AND METHOD OF MANUFACTURING THE APPARATUS

CROSS REFERENCE TO RELATED APPLICATION

This application is based upon and claims the benefit of priority of Japanese Patent Application No. 2000-339061 filed on Nov. 7, 2000, the content of which is incorporated herein by reference.

BACKGROUND OF THE INVENTION

1. Field of the Invention

The present invention relates to a radial roller bearing for holding a rotating shaft, a rotating apparatus in use of the radial roller bearing and a method of manufacturing the rotating apparatus.

2. Description of Related Art

Conventionally, as disclosed in JP-A-11-303771, a radial roller bearing has been used in a rotating apparatus for holding a rotating shaft that transmits rotation to a rotary pump such as a trochoid pump.

FIG. 8 shows a partly enlarged schematic view of a rotating apparatus. In the rotating apparatus, a rotating shaft 20 is held by two radial roller bearings 50A and 50B each having no inner race (hereinafter called merely bearing). A trochoid pump (not shown), which is driven by the rotating shaft, is arranged between the bearings 50A and 50B. Each of the bearings 50A and 50B is composed of rollers 51, holder 52 and an outer race 53. The outer race 53 is provided with first and second flanges 55 and 56 formed by bending opposite ends of a cylindrical portion 54 that is in rolling contact with the rollers 51.

It is observed from an endurance test of the rotating apparatus mentioned above that flaking or peeling sometimes occurs in the cylindrical portion 54 of the outer race 53 in a shorter time. As a result of detail investigations of this reason, it is revealed that (1) hardness or strength is different between the cylindrical portion 54 in a vicinity of the first flange 55 and that in a vicinity of the second flange 56 and (2) the radial roller bearing, in which the flaking or peeling occurs in a shorter time, is assembled to orient itself in an axial direction of the rotating shaft 20 so that the rolling surface of the cylindrical portion 54 in the vicinity of the second flange 56, whose hardness or strength is lower, receives radial load F more intensely than that in the vicinity of the first flange 55. That is, the roller bearing is assembled so that the second flange 56 is positioned nearer to the trochoid pump than the first flange 55 in an axial direction of the rotating shaft.

The reason why the hardness or strength is different between the cylindrical portion 54 in a vicinity of the first flange 55 and that in a vicinity of the second flange 56 is described with reference to FIG. 9. FIG. 9 shows a cross sectional view of the outer race 53 before a portion 56' of the cylindrical portion 54 is bent so as to form the second flange 56 and also shows a hardness change with respect to the rolling surfaces along an axial direction of the outer race 53 after an annealing process. The outer race 53 is made of SPCC (cold rolling steel plate). At first, an end of the cylindrical portion 54 is bent by press forming so as to form the first flange 55. Then, after executing a carbo-nitriding process, the other end of the cylindrical portion 54 (the portion 56') is annealed. Further, after the rollers 51 and the holder 52 are assembled to the outer race 53, the portion 56' of the cylindrical portion 54 is finally bent to form the second flange 56.

Since the annealing process is executed as mentioned above, not only the hardness of the second flange 56 is lowered but also the hardness of the cylindrical portion 54 in a vicinity of the second flange 56 is lowered. Accordingly, the hardness of the cylindrical portion 54 in the vicinity of the second flange 56 is lower by 50 to 100 points (Hv) at Vickers hardness than that of the cylindrical portion 54 in the vicinity of the first flange 55.

Next, the reason why the flaking or peeling occurs on the rolling surface of the cylindrical portion 54 in the vicinity of the second flange 56 is described with reference to FIG. 8. The radial load F generated according to an operation of the trochoid pump acts on the rotating shaft 20 so that the rotating shaft 20 is bent at a relative angle θ to a center axis of the bearing 50A or 50B. The radial force F causes high bearing pressure intensively applied to the rolling surface of the cylindrical portion 54 in the vicinity of the second flange 56. Accordingly, the flaking or peeling occurs in a shorter time on the rolling surface of the cylindrical portion 54 in the vicinity of the second flange 56, whose hardness or strength is lower, due to high bearing pressure intensively applied thereto.

As mentioned above, if the bearing is assembled to orient in an axial direction of the rotating shaft 20 so that the radial load F acts on the rolling surface of the cylindrical portion 54 in the vicinity of the first flange 55, whose hardness or strength is higher, the flaking or peeling is unlikely to occur in a shorter time.

SUMMARY OF THE INVENTION

An object of the invention is to provide a radial roller bearing, in which hardness or strength of a cylindrical portion of an outer race on an axial end side thereof is different from that on another axial end side thereof, having a structure for distinguishing the axial end of the outer race from the another axial end thereof.

Another object of the invention is to provide a rotating apparatus whose rotating shaft is held by a radial roller bearing having a longer life time endurance.

It is a further object to provide a method of manufacturing the rotating apparatus mentioned above.

To achieve the above object, a radial roller bearing has an outer race and rollers. The outer race has a cylindrical portion and first and second flanges extending radially inward from opposite axial ends of the cylindrical portion, respectively. Hardness or strength of the cylindrical portion in a vicinity of the first flange is different from that in a vicinity of the second flange. The rollers are arranged circumferentially inside the cylindrical portion so as to come in slidable contact therewith.

With the structure of the radial roller bearing mentioned above, a shape of the first flange is different from that of the second flange or a mark is affixed on one of the first and second flanges so as to identify an axial side of the outer race on which either the first flange or the second flange is positioned.

When a pair of the radial roller bearings mentioned above are assembled to a rotating apparatus in which a rotating shaft is rotatably held by the radial roller bearings and a radial load acts on the rotating shaft between the radial roller bearings, first of all, the axial side of the outer race on which the first flange or the second flange of each of the radial roller bearings is positioned can be easily identified based on the shape difference between the first and second flanges or the mark affixed on the one of the first and second flanges. Then, each of the radial roller bearings is easily and confidently assembled so as to orient the outer race in an axial direction of the rotating shaft so that the cylindrical portion in the vicinity of the first flange, whose hardness or strength is higher, receives higher bearing pressure due to the radial load. As a result, flaking or peeling is unlikely to occur in a shorter time so that life time endurance and strength of each of the radial roller bearings is improved.

It is preferable that an inner diameter of the first flange is different from that of the second flange to distinguish the first flange from the second flange.

The inner diameter of the first flange is, preferably, smaller than that of the second flange. If each of the radial roller bearings is assembled so as to orient the outer race axially so that the cylindrical portion in the vicinity of the first flange, whose hardness or strength is higher, receives higher bearing pressure, strength of the radial roller bearing is not jeopardized by the larger inner diameter of the second flange since the cylindrical portion in the vicinity of the second flange receives lower bearing pressure.

Further, to distinguishing the first flange from the second flange, one of the first and second flanges may be provided with a notch or a projection.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

FIG. 6 is an elevation view of a bearing according to a third embodiment of the present invention;

FIG. 7 is a cross sectional view taken along a line VII—VII of FIG. 6;

DETAILED DESCRIPTION OF THE PREFERRED EMBODIMENTS (First Embodiment)

Figure 2:
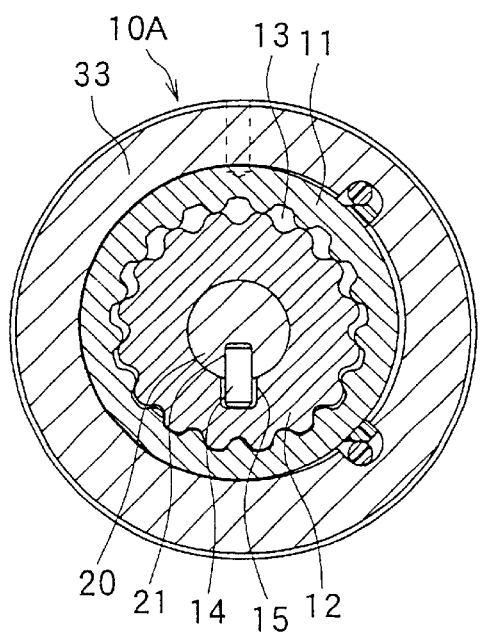
FIG. 2 is a cross sectional view taken along a line II—II of FIG. 1.
Figure 3:
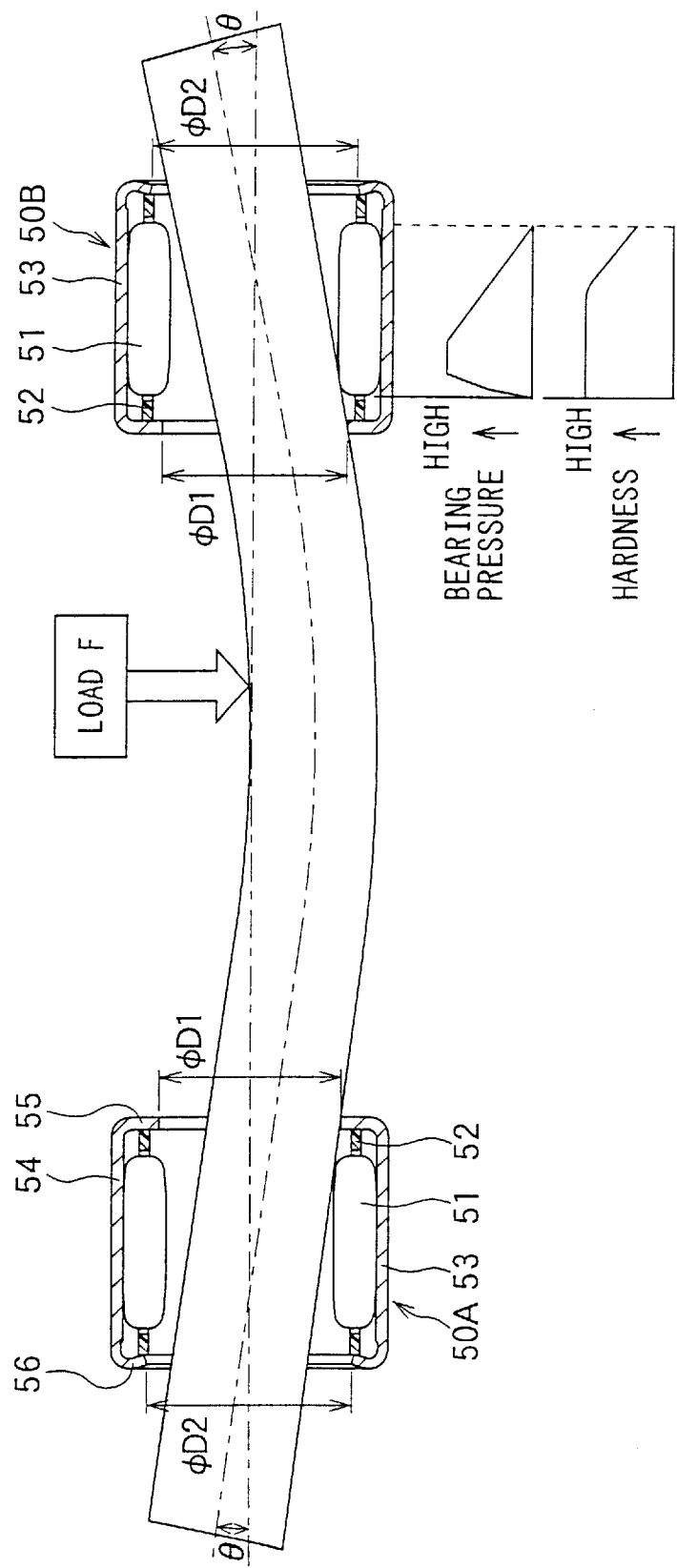
FIG. 3 is a schematic view of bearings and rotating shaft of FIG. 1.

A rotating apparatus according to a first embodiment is described with reference to FIGS. 1 to 3. The rotating device is a pump device, which sucks brake liquid for pressurizing and discharges pressurized brake liquid, typically, applicable to ABS actuator for a vehicle brake apparatus.

Figure 1:
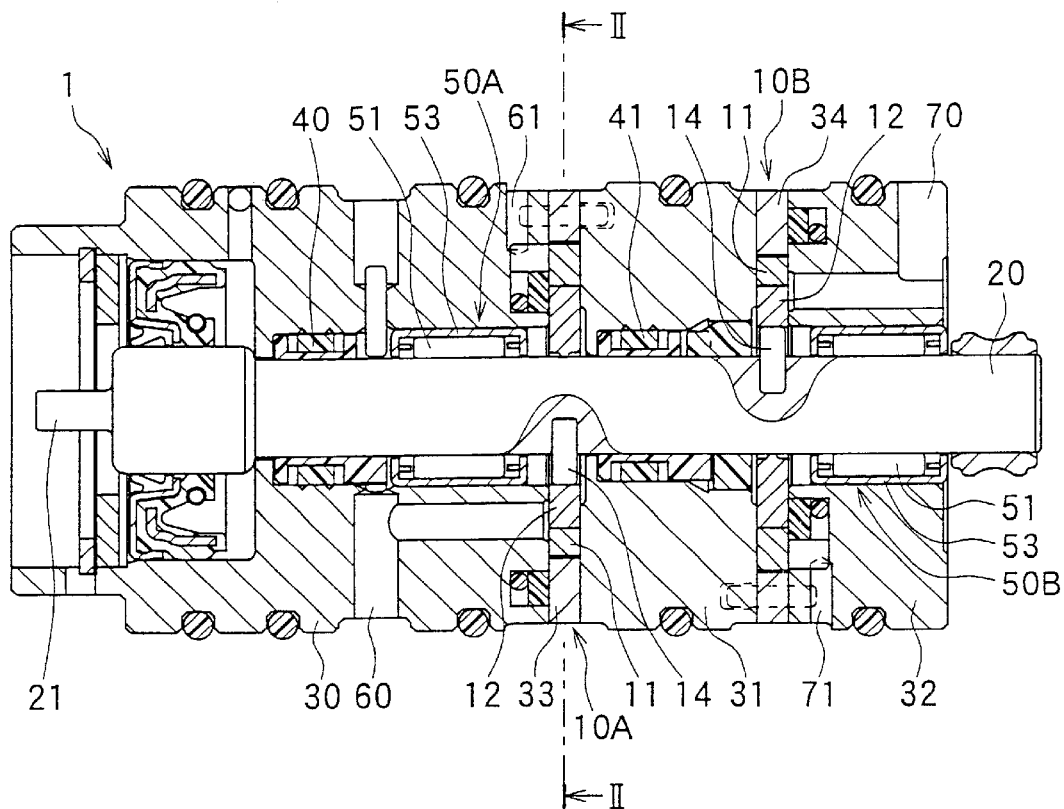
FIG. 1 is across sectional view of a rotating apparatus according to a first embodiment of the present invention.

As shown in FIG. 1, a pump body 1, which is inserted into and assembled to a housing (not shown) of the ABS actuator, is provided with a first pump 10A for a first piping system and a second pump 10B for a second piping system.

An axial end 21 of a rotating shaft 20 is coupled with a shaft of an electric motor (not shown) and the motor drives the rotating shaft so that both of the first and second pumps 10A and 10B are driven. The first and second pumps 10A and 10B, which are driven by the rotating shaft, sucks brake liquid and discharges them to the first and second piping systems, respectively.

Each of the first and second pumps 10A and 10B is a rotary pump such as a trochoid pump (internal gear pump). As structures of the first and second pumps 10A and 10B are same, only the first pump 10A is described below and component parts of the second pump 10B are affixed with the same reference numbers as those of the first pump 10A and their explanations are omitted.

The pump body 1 is composed of first, second and third cylindrical side plates 30, 31 and 32, and first and second cylindrical center plates 33 and 34. The first, second and third cylindrical side plates 30, 31 and 32 and the first and second cylindrical center plates 33 and 34 are alternately stacked on top of each other.

Each inner diameter of the first to third cylindrical side plates 30 to 32 is smaller than each inner diameter of the first and second cylindrical center plate 33 and 34. A space (rotor chamber) is formed by side surfaces of adjacent two of the first to third cylindrical side plates 30 to 32 and an inner circumferential surface of each of the first and second cylindrical center plate 33 and 34 sandwiched thereby. Outer and inner rotors of each of the first and second pump 10A and 10B are accommodated in the rotor chamber.

The first pump 10A, which is arranged in the rotor chamber formed by the first and second cylindrical side plates 30 and 31 and the first cylindrical center plate 33, has rotors composed of an outer rotor whose inner circumference is provided with internal gears and an inner rotor 12 whose outer circumference is provided with external gears. Center axes of the outer and inner rotors 11 and 12 in mesh are eccentric.

The outer and inner rotors 11 and 12 rotate in mesh and each volume of a plurality of gaps 13 formed between the internal and external gears is changed according to the rotations of the outer and inner rotors 11 and 12. Some of the plurality of gaps 13 on an intake side communicate with an intake port 60 and some of the plurality of gaps 13 on a discharge side communicate with a discharge port 61.

A rotating shaft 20 is inserted into a through-hole of the inner gear 12. The rotating shaft 20 is provided with an aperture 21, into which one end of a column shaped pin 14 is inserted. The rotor 12 is provided with a key groove 15, into which the other end of the pin 14 is inserted. Accordingly, torque is transmitted from the rotating shaft 20 to the inner rotor 12 via the pin 14. Each volume of the gaps 13 is changed according to the rotations of the inner and outer rotor 12 and 11 based on the rotation of the rotating shaft 20 so that the brake fluid is sucked and discharged.

Though the structure of the second pump 10B is same to that of the first pump 1A, as mentioned above, the second pump 10B is arranged at a position where the first pump 10A rotates about a center axis of the rotating shaft 20 by a 180 degree angle. Further, with respect to the second pump 10B, some of the gaps 13 on an intake side communicate with an intake port 70 and some of the gaps on a discharge side communicate with a discharge port 71.

The first cylindrical side plate 30, which is positioned nearest to the motor, is provided at an inner circumference thereof with a seal member 40 for sealing fluid communication between the motor and the first pump 10A, and with a first bearing 50A that holds rotatably the rotating shaft 20.

The second cylindrical side plate 31, which is positioned between the first and second pumps 10A and 10B, is provided at an inner circumference thereof with a seal member 41 for sealing fluid communication between the first and second pumps 10A and 10B. The third cylindrical side plate 32, which is positioned the most far away from the motor, is provided at an inner circumference thereof with a second bearing 50B that holds rotatably the rotating shaft 20.

The first and second pumps 10A and 10B are sandwiched in an axial direction of the rotating shaft 20 by the first and second bearings 50A and 50B. Accordingly, the first and second bearing 50A and 50B receive radial load being produced by operations of the first and second pumps 10A and 10B and acting on the rotating shaft 20.

The intake port 60 and discharge port 61 are formed in the first cylindrical side plate 30. The intake port 70 and discharge port 71 are formed in the third cylindrical side plate 32.

Structures of the first and second bearings 50A and 50B are described with reference to FIGS. 1 to 3. As the structures of the first and second bearings 50A and 50B are same, only the first bearing 50A is described below and component parts of the second bearing 50B are affixed with the same reference numbers as those of the first bearing 50A and their explanations are omitted.

The first bearing 50A is a radial roller bearing composed of a plenty of needle shaped rollers 51, a holder for positioning the rollers 51, and an outer race 53 for accommodating the rollers 51 and the holder 52.

Each of the rollers 51 is made of SUJ2 (high carbon chromium bearing steel) and is processed by quenching and annealing heat treatments. The holder 52 is made of nylon or SPCC (cold rolling steel plate) processed by soft nitriding and is formed generally in shape of a cylinder whose wall thickness is thin. The holder 52 is provided with a plenty of resesses, whose number is same as that of the rollers and to which the rollers 51 is slidably fitted.

The outer race 53 is made of SPCC (cold rolling steel plate) and is provided with a cylindrical portion 54, whose cylindrical wall thickness is thin, coming in contact with outer circumferential surfaces of the rollers 51 and serving as a rolling surface of the rollers 51, and with first and second flanges 55 and 56 extending radially inward from opposite axial ends of the cylindrical portion 54, respectively.

On manufacturing the first bearing 50A, the first flange 55 is formed at first by bending an axial end of the cylindrical portion 54 by press forming. Then, an entire body of the outer race 53 is processed by a carbo-nitriding treatment. Further, the other axial end of the cylindrical portion 54, which is bent later so as to form the second flange 56, is processed by an annealing treatment. Furthermore, after the rollers 51 and the holder 52 are assembled to the outer race 53, the other axial end of the cylindrical portion 54 is bent to form the second flange 56.

Since the annealing process is executed on the outer race 53 on a side of the second flange 56 as mentioned above, not only the hardness of the second flange 56 is lowered but also the hardness of the cylindrical portion 54 in a vicinity of the second flange 56 is lowered. Accordingly, the hardness or strength of the cylindrical portion 54 in the vicinity of the second flange 56 becomes lower than that of the cylindrical portion 54 in the vicinity of the first flange 55. A test result proves that flaking or peeling is likely to occur on the rolling surface of the cylindrical portion 54, if the first or second bearing 10A or 10B is assembled without orientating itself in an axial direction of the rotating shaft 20 because radial force causes high bearing pressure more intensively applied to the cylindrical portion in the vicinity of the second flange 56, whose hardness or strength is lower.

According to the first embodiment, a shape of the first flange 55 is different from that of the second flange 56 for identifying an axial side of the outer race 53 on which either the first flange 55 or the second flange 56 is positioned. That is, an inner diameter $\phi D1$ of the first flange 55 is different from and smaller than an inner diameter $\phi D2$ of the second flange 56. As each dimension of $\phi D1$ and $\phi D2$ has a tolerance (min, max), it is set to satisfy a relationship, $\phi D1$ (max)<$\phi D2$ (min). Preferably, a dimensional difference between $\phi D1$ and $\phi D2$ ($\phi D2$ (min)–$\phi D1$ (max)) is not less than 0.5 mm.

The first bearing 50A is assembled to the first cylindrical side plate 30 in a manner mentioned below. In use of the dimensional difference (shape difference) of the inner diameters of the first and second flanges 55 and 56, a first step is to identify an axial side of the outer race 53 on which either the first flange 55 or the second flange 56 is positioned, that is, to identify an axial side of the outer race 53 whose hardness or strength is higher than the other axial side thereof (identifying process). A second step is to assemble the first bearing 50A to the cylindrical side plate 30 to orient the first flange 55 in an axial direction of the rotating shaft 20 so that the radial load F causes bearing pressure more intensively applied to the cylindrical portion 54 in the vicinity of the first flange 55, whose hardness or structure is higher than that of the cylindrical portion 54 in the vicinity of the second flange 56. That is, the second step is to assemble the first bearing 50A to the cylindrical side plate 30 so that the first flange 55 is located in an axial direction of the rotating shaft 20 at a place nearer to the first or second pumps 10A or 10B than the second flange 56 (bearing assembly process).

The second bearing 50B is assembled to the third cylindrical side plate 32 through the identifying process and the bearing assembly process mentioned above similarly to the first bearing 50A so that the first flange 55 of the second bearing 50B is located in an axial direction of the rotating shaft 20 at a place nearer to the first or second pumps 10A or 10B than the second flange 56 of the second bearing 50B.

An operation of the pump body 1 is described below. When ABS control is executed as a wheel shows a locking symptom, or when higher braking force is necessary (for example, when the braking force corresponding to a depressing force of a brake pedal can not be sufficiently obtained or when an operating amount of the brake pedal is large), the pump body 1 is driven so that brake fluid in a reservoir or in a main circuit for braking is sucked, pressurized and discharged. The discharged brake fluid serves to increase pressure of a wheel cylinder.

At this time, each of the first and second pumps 10A and 10B sucks brake fluid from each of the intake ports 60 and 70 and discharges it from each of the discharge ports 61 and 71. When the pumps 10A and 10B operate, the radial force F acts on the rotating shaft 20 since a reaction force generated by highly pressurizing the brake fluid is transmitted to the rotating shaft 20. Accordingly, the rotating shaft 20 is bent at a relative angle θ to a center axis of the bearing 50A or 50B so that the rotating shaft 20 is intensively held by and the radial load is intensively received by the cylindrical portion 54 in the vicinity of the first flange 55 rather than the cylindrical portion 54 in the vicinity of the second flange 56. As a result, higher bearing pressure is applied to the cylindrical portion 54 in the vicinity of the first flange 55.

According to the first embodiment, since the hardness or strength of cylindrical portion 54 in the vicinity of the first flange 55 is higher than that of the cylindrical portion 54 in the vicinity of the second flange 56, flaking or peeling is unlikely to occur. Further, it is proved from a test result that a rolling life time of the first or second bearing 50A or 50B according to the first embodiment is longer by two to five times, compared to that according to the conventional pump body in which the cylindrical portion 54 in the vicinity of the second flange 56 intensively receives the radial load F.

As mentioned above, as the inner diameter φD1 of the first flange 55 is smaller than the inner diameter φD2 of the second flange 56, not only the first and second bearings 10A and 10B are easily and confidently assembled to orient themselves in the axial direction of the rotating shaft 20 by distinguishing the first flange 55 from the second flange 56 based on the dimensional difference between the inner diameters thereof, but also strengths of the first and second bearings 10A and 10B against the bearing pressure due to the radial load are not jeopardized.

For the purpose of distinguishing the first flange 55 from the second flange 56 in order to orient the first or second bearing 10A or 10B in the axial direction of the rotating shaft 20, the dimensional relationship between the inner diameters of the first and second flanges 55 and 56 may be φD2 (max)<φD1 (min), instead of φD1 (max)<φD2 (min) according to the first embodiment.

(Second Embodiment)

Figure 4:
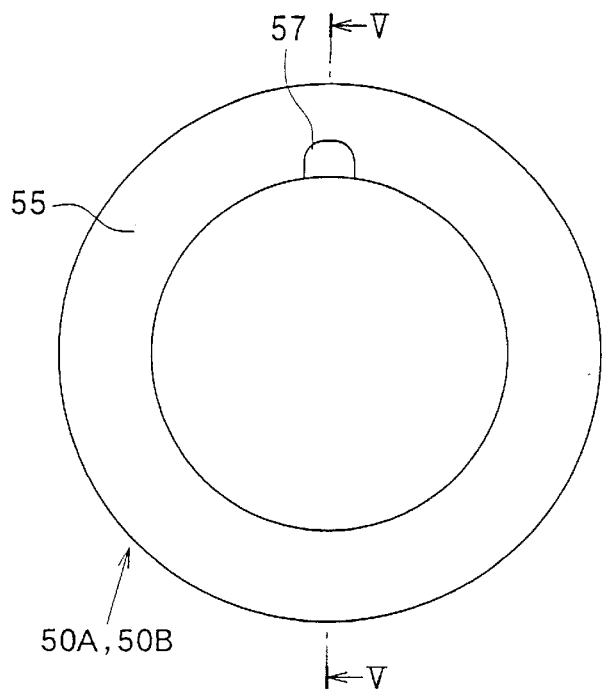
FIG. 4 is an elevation view of a bearing according to a second embodiment of the present invention.
Figure 5:
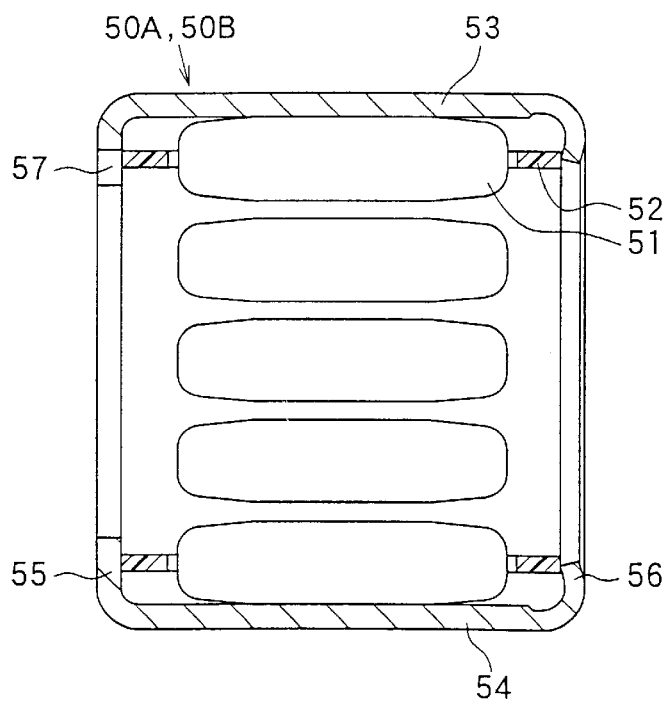
FIG. 5 is a cross sectional view taken along a line V—V of FIG. 4.
Figure 8A:
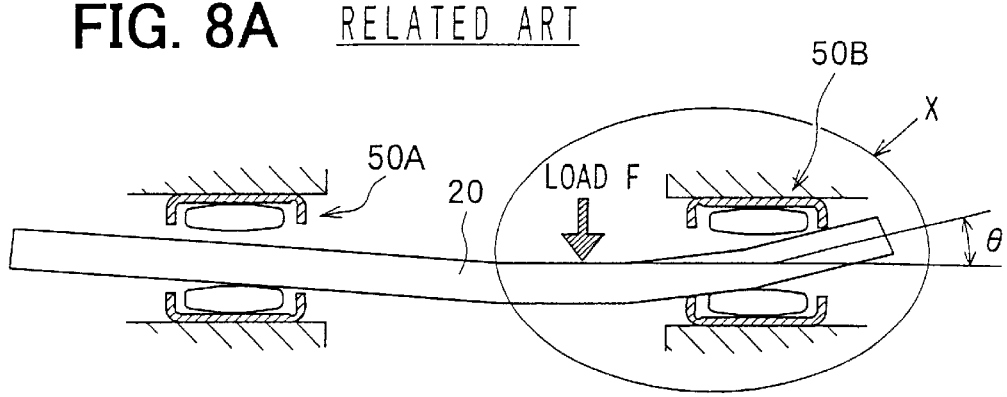
FIG. 8A is a schematic view showing a rotating shaft bending due to a radial load.
Figure 8B:
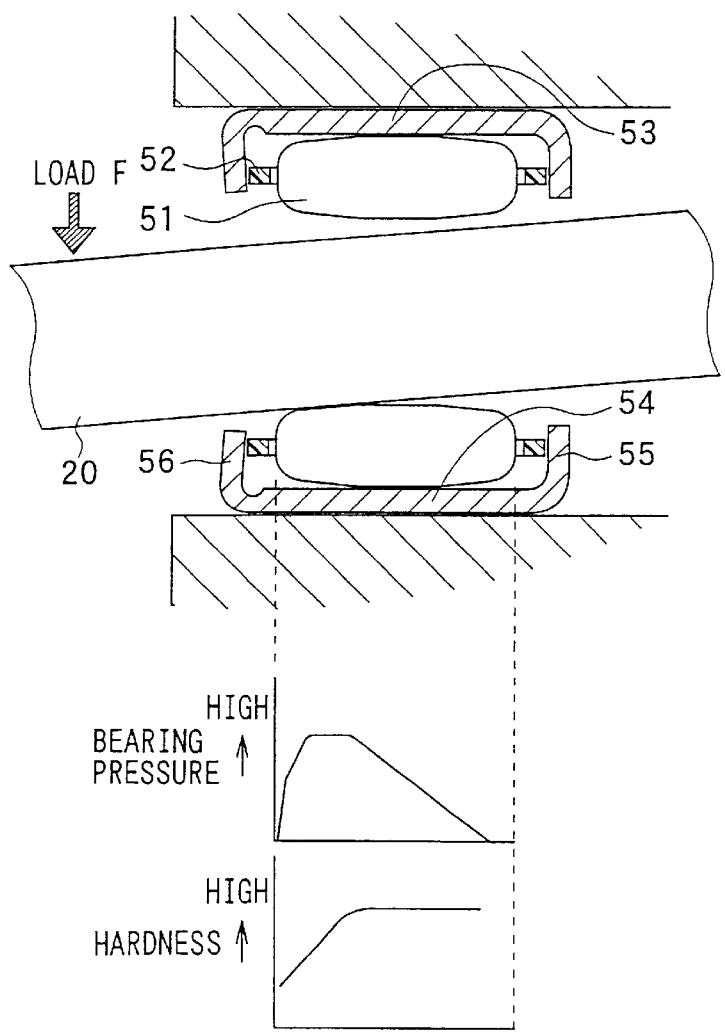
FIG. 8B is an enlarged view of a portion surrounded by a circle X of FIG. 8A.
Figure 9:
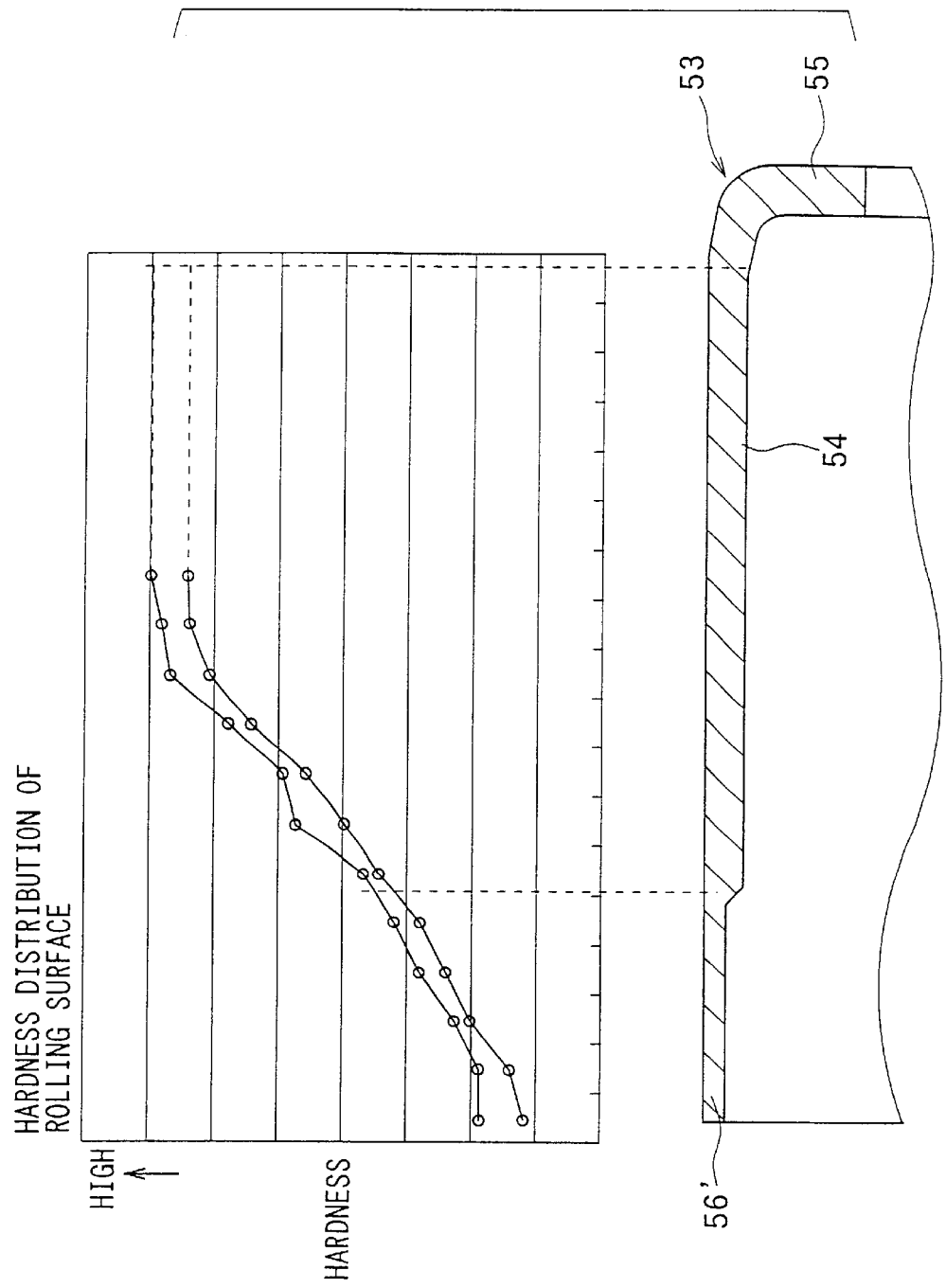
FIG. 9 is a chart showing hardness of an outer race of a bearing along an axis thereof before rollers are assembled.

A first or second bearings 50A or 50B according to a second embodiment is described with reference to FIGS. 4 and 5. Instead of making the inner diameter φD1 of the first flange 55 different from the inner diameter φD2 of the second flange 56 according to the first embodiment, one of the first and second flanges 55 and 56 is provided at an inner circumference thereof with a notch 57 that serves as a mark for distinguishing the first flange 55 from the second flange 56 according to the second embodiment.

The notch 57 is used to distinguish between an axial side of the outer race 53 whose hardness or strength is higher (a side of the first flange 55) and the other axial side of the outer race 53 whose hardness or structure is lower (a side of the second flange 56). The identifying process similar to that of the first embodiment is executed in use of the notch 57. Then, each of the first and second bearing 50A and 50B is assembled to each of the first and third cylindrical side plates 30 and 32, respectively, so as to orient the axial side of the outer race whose hardness or strength is higher to an axial side of the rotating shaft 20 which receives the radial load F. This is a bearing assembly process similar to that of the first embodiment.

According to the second embodiment, since the cylindrical portion 54 in the vicinity of the first flange 55, whose hardness or strength is higher, receives higher bearing pressure caused by the radial load F, the flaking or peeling is unlikely to occur in a shorter time.

As mentioned above, the first and second bearings 10A and 10B are easily and confidently assembled to orient themselves in the axial direction of the rotating shaft 20 by distinguishing the first flange 55 from the second flange 56 based on an existence or nonexistence of the notch 57.

Instead of providing the notch 57 in the first flange 55, the notch 57 may be provided in the second flange 56. In this case, strengths of the first and second bearings 10A and 10B against the bearing pressure due to the radial load are not jeopardized, since the axial side of the outer race 53 that is provided with the notch 57 (the cylindrical portion 54 in the vicinity of the second flange 56) receives lower bearing pressure due to the radial load F as its nature.

Further, the first or second flange 55 or 56 may be provided with a plurality of notches 57 or notches 57 may be provided in both of the first and second flanges 55 and 56 in such a manner that respective shapes, numbers or largeness of the notches 57 differ between the first and second flanges 55 and 56.

(Third Embodiment)

A first or second bearings 50A or 50B according to a third embodiment is described with reference to FIGS. 6 and 7. Instead of making the inner diameter φD1 of the first flange 55 different from the inner diameter φD2 of the second flange 56 according to the first embodiment, one of the first and second flanges 55 and 56 is provided with a projection 58 that serves as a mark for distinguishing the first flange 55 from the second flange 56 according to the third embodiment.

The projection 58 is used to distinguish between an axial side of the outer race 53 whose hardness or strength is higher (a side of the first flange 55) and the other axial side of the outer race 53 whose hardness or structure is lower (a side of the second flange 56). The identifying process similar to that of the first embodiment is executed in use of the projection 58. Then, each of the first and second bearing 50A and 50B is assembled to each of the first and third side plates 30 and 32, respectively, so as to orient the axial side of the outer race whose hardness or strength is higher to an axial side of the rotating shaft 20 which receives the radial load F. This is a bearing assembly process similar to that of the first embodiment.

According to the third embodiment, since the cylindrical portion 54 in the vicinity of the first flange 55, whose hardness or strength is higher, receives bearing pressure caused by the radial load F, the flaking or peeling is unlikely to occur in a shorter time.

As mentioned above, the first and second bearings 10A and 10B are easily and confidently assembled to orient themselves in the axial direction of the rotating shaft 20 by distinguishing the first flange 55 from the second flange 56 based on an existence or nonexistence of the projection 58.

Further, the first or second flange 55 or 56 may be provided with a plurality of projections 58 or projections 58 may be provided in both of the first and second flanges 55 and 56 in such a manner that respective shapes, numbers or largeness of the projections 58 differ between the first and second flanges 55 and 56.

It is very effective to apply the rotating apparatus of the present invention to the pump body for the ABS actuator in which the bearing pressure acting on the cylindrical portion 54 of the outer race 53 is very high, as mentioned above. However, the rotating apparatus of the present invention is also applicable to any rotating apparatus in which radial load acts on a rotating shaft according to an operation of a pump device (for example, a rotary pump, a reciprocal pump) or a device other than the pump device driven by the rotating shaft.

Moreover, instead of providing the notch 57 or the projection 58 in the first or second flange 55 or 56, any other mark such as a color mark or a recess mark may be provided for distinguishing the first flange 55 from the second flange 56.

What is claimed is:

1. A radial roller bearing comprising:
   an outer race having a cylindrical portion and first and second flanges extending radially inward from opposite axial ends of the cylindrical portion, respectively, hardness or strength of the cylindrical portion in a vicinity of the first flange being different from that in a vicinity of the second flange, and
   rollers arranged circumferentially inside the cylindrical portion so as to come in slidable contact therewith, wherein a shape of the first flange is different from that of the second flange for identifying an axial side of the outer race on which either the first flange or the second flange is positioned.

2. A radial roller bearing according to claim 1, wherein an inner diameter of the first flange is different from that of the second flange.

3. A radial roller bearing according to claim 2, wherein the hardness or strength of the cylindrical portion in a vicinity of the second flange is lower than that in a vicinity of the first flange and the inner diameter of the second flange is larger than that of the first flange.

4. A rotating apparatus having a rotating shaft and a pair of radial roller bearings for rotatably holding the rotating shaft, radial load acting on the rotating shaft between the pair of radial roller bearings, each of the radial roller bearings comprising:

an outer race having a cylindrical portion and first and second flanges extending radially inward from opposite axial ends of the cylindrical portion, respectively, hardness or strength of the cylindrical portion in a vicinity of the first flange being higher than that in a vicinity of the second flange; and rollers arranged circumferentially inside the cylindrical portion so as to come in slidable contact therewith, wherein a shape of the first flange is different from that of the second flange for identifying an axial side of the outer race on which either the first flange or the second flange is positioned and, further, wherein the radial roller bearing is assembled so as to orient the first and second flanges in an axial direction of the rotating shaft so that the radial load causes bearing pressure intensively applied to the cylindrical portion in the vicinity of the first flange rather than the cylindrical portion in the vicinity of the second flange.

5. A rotating apparatus according to claim 4, wherein an inner diameter of the first flange is different from that of the second flange.

6. A rotating apparatus according to claim 4, wherein the inner diameter of the first flange is smaller than that of the second flange.

7. A method of manufacturing a rotating apparatus having a rotating shaft and a pair of radial roller bearings for rotatably holding the rotating shaft, radial load acting on the rotating shaft between the pair of radial roller bearings, each of the radial roller bearings comprising an outer race having a cylindrical portion and first and second flanges extending radially inward from opposite axial ends of the cylindrical portion, respectively, hardness or strength of the cylindrical portion in a vicinity of the first flange being higher than that in a vicinity of the second flange, and rollers arranged circumferentially inside the cylindrical portion so as to come in slidable contact therewith, comprising steps of:

identifying an axial side of the outer ring of each of the radial roller bearings on which either the first flange or the second flange is positioned; and assembling the each of the radial roller bearings so as to orient the first and second flanges in an axial direction of the rotating shaft so that the radial load causes bearing pressure intensively applied to the cylindrical portion in the vicinity of the first flange rather than the cylindrical portion in the vicinity of the second flange.

* * * * *